United States Patent
Ho et al.

(10) Patent No.: US 6,819,165 B2
(45) Date of Patent: Nov. 16, 2004

(54) VOLTAGE REGULATOR WITH DYNAMICALLY BOOSTED BIAS CURRENT

(75) Inventors: Stacy Ho, San Antonio, TX (US); Thomas James Barber, Jr., Bolton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/435,861

(22) Filed: May 12, 2003

(65) Prior Publication Data

US 2004/0008077 A1 Jan. 15, 2004

Related U.S. Application Data

(60) Provisional application No. 60/384,355, filed on May 30, 2002, and provisional application No. 60/384,750, filed on May 30, 2002.

(51) Int. Cl.[7] .................................................. G06F 1/10
(52) U.S. Cl. ........................ 327/541; 327/540; 323/316
(58) Field of Search .................................. 327/538, 540, 327/541, 543; 323/313, 316

(56) References Cited

U.S. PATENT DOCUMENTS

| | | |
|---|---|---|
| 4,617,473 A | 10/1986 | Bingham |
| 4,683,382 A | 7/1987 | Sakurai et al. |
| 5,295,112 A | 3/1994 | Taniguchi |
| 5,463,588 A | 10/1995 | Chonan |
| 5,545,978 A | 8/1996 | Pontius |
| 5,621,601 A | 4/1997 | Fujihira et al. |
| 5,631,598 A | 5/1997 | Miranda et al. |
| 5,821,808 A | 10/1998 | Fujima |
| 5,862,091 A | 1/1999 | Bion et al. |
| 5,867,015 A * | 2/1999 | Corsi et al. ............... 323/316 |
| 5,889,395 A | 3/1999 | Lundberg |
| 5,917,311 A * | 6/1999 | Brokaw ..................... 323/280 |
| 6,002,295 A * | 12/1999 | Gens et al. ................ 327/546 |
| 6,058,061 A | 5/2000 | Ooishi |
| 6,225,857 B1 * | 5/2001 | Brokaw ..................... 327/540 |
| 6,333,669 B1 | 12/2001 | Kobayashi et al. |
| 2004/0000896 A1 | 1/2004 | Barber, Jr. et al. |

OTHER PUBLICATIONS

R. Jacob Baker, Harry W. Li & David E. Boyce, CMOS: Circuit Design, Layout, and Simulation. 699–703, 717 (Stuart K. Tewksbury, series ed., IEEE Press ) (1998).

* cited by examiner

Primary Examiner—Terry D. Cunningham
(74) Attorney, Agent, or Firm—Iandiorio & Teska

(57) ABSTRACT

A voltage regulator with dynamically boosted bias current includes a pass device for providing current to a load; an error circuit responsive to a difference between a predetermined reference voltage and a function of the voltage on the load to produce an error signal, a driver circuit responsive to the error signal for controlling the pass device to adjust the current to the load to reduce the error signal, the driver circuit including an amplifier responsive to the error signal for controlling the pass device, a bias current source for biasing the amplifier, a sensing circuit for sensing a portion of the error signal, a reference current source for providing a reference current, a second error circuit responsive to a difference between the portion of the error signal and the reference current to produce a second error current; and a boost circuit responsive to the second error signal to increase the bias current provided to the amplifier when the load demands more current.

9 Claims, 3 Drawing Sheets

VOLTAGE REGULATOR WITH DYNAMICALLY BOOSTED BIAS CURRENT

RELATED APPLICATIONS

This application is related to U.S. Provisional Application Ser. No. 60/384,355, filed on May 30, 2002 entitled MULTIMODE CMOS LOW DROP-OUT VOLTAGE REGULATOR, to Barber et al. (AD-323J) and (complete application MULTIMODE VOLTAGE REGULATOR to Barber et al. (AD-323J)) and U.S. Provisional Application Ser. No. 60,384,750, filed on May 30, 2002, entitled METHOD FOR DYNAMIC BOOSTING OF BIAS CURRENT IN A SERIES VOLTAGE REGULATOR to Ho et al. (AD-324J).

FIELD OF THE INVENTION

This invention relates to a voltage regulator with dynamically boosted bias current.

BACKGROUND OF THE INVENTION

Conventional voltage regulators aim to maintain a constant voltage on a load through variations in load current and changes in supply voltage. Typically, an off-chip external pass device provides current to a load. The load voltage is maintained by an on-chip error circuit, which typically senses a fraction of the load voltage through a voltage divider and compares it to a reference voltage. A difference between the sensed load voltage and the reference voltage produces an error signal which is buffered by an on chip driver circuit to drive the pass device to reduce the error signal. Such driver circuits require a large static bias current which must always be present in order to provide adequate slew current in order to keep transient voltage changes and recovery times due to line or load changes within acceptable limits. The large static bias currents are a constant drain on the battery or other power supply sources. Attempts to decrease the static bias currents not only slow the transient response but increase the output impedance of the driver circuit and decrease bandwidth.

BRIEF SUMMARY OF THE INVENTION

It is therefore an object of this invention to provide an improved voltage regulator with dynamically boosted bias current.

It is a further object of this invention to provide such an improved voltage regulator with dynamically boosted bias current which reduces changes in output voltage and output voltage recovery time in response to a change in load current or change in supply voltage.

It is a further object of this invention to provide such an improved voltage regulator with dynamically boosted bias current which achieves those goals with less static bias current.

It is a further object of this invention to provide such an improved voltage regulator with dynamically boosted bias current which achieves those goals while reducing the output impedance of the driver circuit.

It is a further object of this invention to provide such an improved voltage regulator with dynamically boosted bias current which extends the bandwidth of the driver circuit.

The invention results from the realization that a voltage regulator which reduces transient voltage changes and recovery time and reduces the output impedance of the driver circuit while extending the bandwidth of the driver circuit can be achieved with lower static bias current by sensing the error signal, comparing it to a reference signal and obtaining a second error signal which is gained up to boost the bias current of the driver circuit that controls the external pass device that provides current to a load.

This invention features a voltage regulator with dynamically boosted bias current including a pass device for providing current to a load. There is an error circuit responsive to a difference between a predetermined reference voltage and a function of the voltage on the load to produce an error signal. A driver circuit responsive to the error signal controls the pass device to adjust the current to the load to reduce the error signal. The driver circuit includes: an amplifier responsive to the error signal for controlling the pass device, a bias current source for biasing the amplifier, a sensing circuit for sensing a portion of the error signal, a reference current source for providing a reference current and a second error circuit responsive to a difference between the portion of the error signal and the reference current to produce a second error signal. A boost circuit responsive to the second error signal increases the bias current provided to the amplifier when the load demands more current.

In an preferred embodiment the pass device includes a transistor. The error circuit may include an error amplifier and a voltage divider for providing a fraction of the sensed voltage on the load to the error amplifier. The second error circuit may include a first current mirror responsive to the portion of the error signal and the reference current to produce the second error signal. The boost circuit may include a second mirror circuit for gaining up the second error signal to increase the bias current provided to the amplifier when the load demands more current. The portion of the error signal may be approximately an order of magnitude less than the error signal. The boost circuit may have a gain of at least one order of magnitude. The second error circuit may have a gain of approximately unity. The error circuit and driver circuit may be on chip and the pass device may be off chip.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
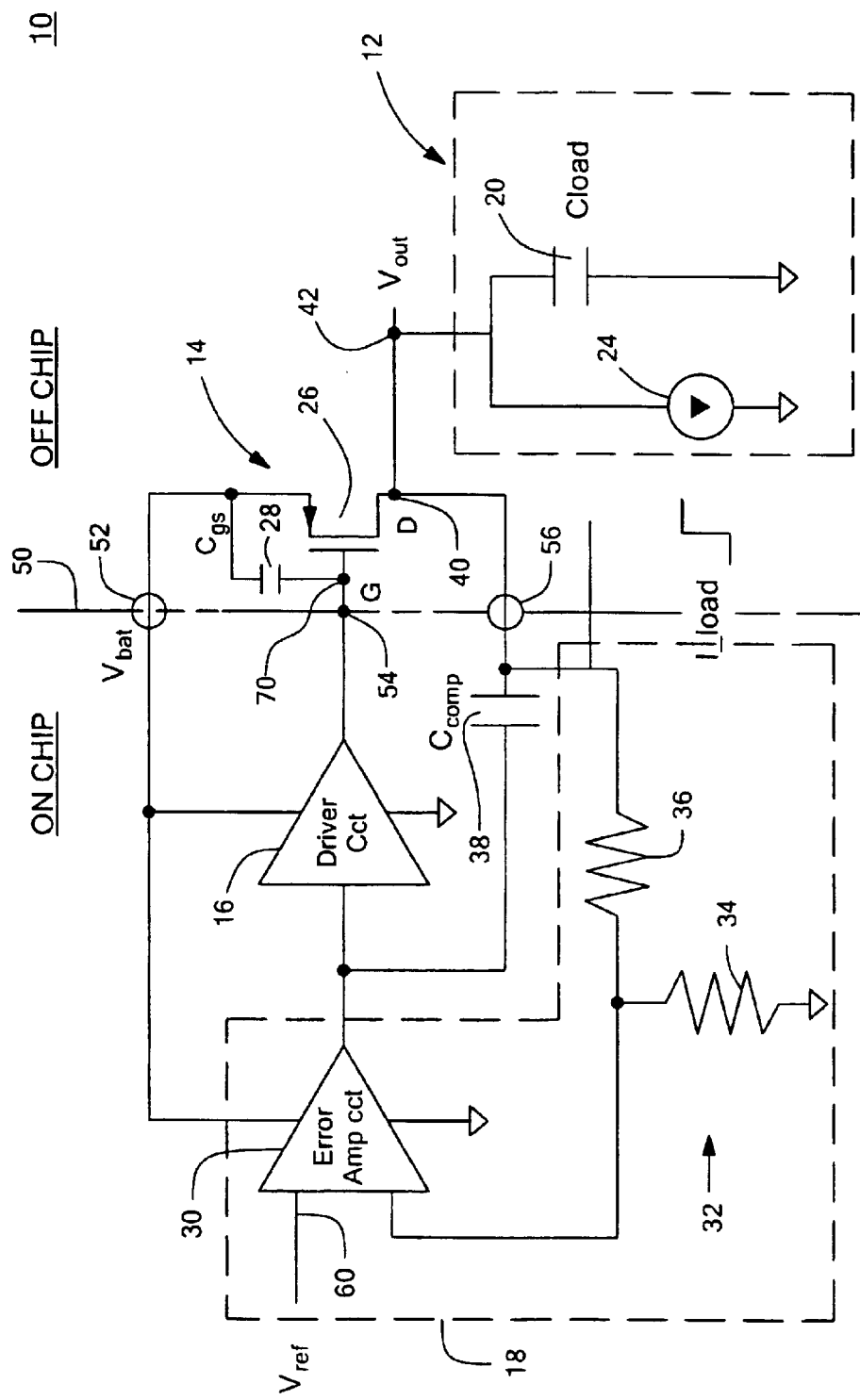
FIG. 1 is a schematic diagram of a prior art voltage regulator.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a prior art voltage regulator 10 including a load 12 and pass device 14 supplying current to the load, a driver circuit 16 for controlling pass device 14 and an error circuit 18 which senses the output voltage $V_{out}$ at load 12. Load 12 includes capacitor 20 and a current source 24. Pass device 14 typically includes transistor 26 with its inherent gate to source capacitance $C_{gs}$ 28. Pass device 14 is shown as an off-chip, external pass device in FIG. 1 but it can be on-chip. Error circuit 18 includes error amplifier 30 and voltage divider 32 including resistors 34 and 36. A loop compensation capacitor 38 is connected between $V_{out}$ at output 42 and the input of driver circuit 16.

Typically external pass device 14 and load 12 are off chip while driver 16, compensation capacitor 38, voltage divider 32 and error amplifier 30 are on chip; the chip boundary is indicated at 50. The external connection pins are shown for the battery or other power supply at 52, for the driver circuit output at 54, and for voltage regulator output 56. In operation the voltage at drain 40 and output 42, that is output voltage $V_{out}$ on load 12, is sensed and a fraction of it is fed back through the voltage divider 32 to one input of error amplifier 32. The other input 60, of error amplifier 30 receives a voltage reference. Any difference between the fraction of the voltage fed back from the output 42 and the reference voltage on input 60 produces an error signal output from error amplifier 30. This error signal is delivered to driver circuit 16 causing it to change the voltage at pin 54 and gate 70 of transistor 26 in order to increase or decrease the current flow to load 12 in the direction which will reduce the difference between the sensed voltage from voltage divider 32 and the reference voltage 60. Any increase in the current demand by load 12 or change in the power supply voltage at pin 52 will cause an error signal.

An increase in current demand from load 12 requires more current from pass device which will decrease the voltage $V_{out}$ at output 42. This decrease in voltage produces an error signal from error amplifier circuit 30 to driver circuit 16, so that driver circuit 16 will decrease the voltage to gate 70 to turn it on harder and increase its conduction, thus meeting the demand for current flow and raising point 40 and output 42 back to the steady state voltage prior to the change in the load demand. Conversely, upon a decrease in demand for current by load 12, drain 40 of transistor 26 will rise. This will produce an error signal from error amplifier 30 to driver circuit 16 so that it will increase the voltage at gate 70 decreasing the current flow through transistor 26.

One of the problems with this prior art device is that in order to meet changes in the voltage and to recover quickly from the changes, a substantial static bias current must be constantly supplied to driver circuit 16, even though it is not actively compensating all the time for voltage changes and current demands by the load. This consumes substantial power and reduces the efficiency of the device and reduces the charge of the battery. One reason that the static bias current to driver circuit 16 must be kept fairly large is because the capacitance $C_{gs}$ 28 is fairly large, in the neighborhood of 100 to 300 pf. Therefore, a large slew current is required to respond to the load demands within acceptable time limits. This limits the ability to reduce the static bias current and improve the efficiency of the device.

Figure 2:
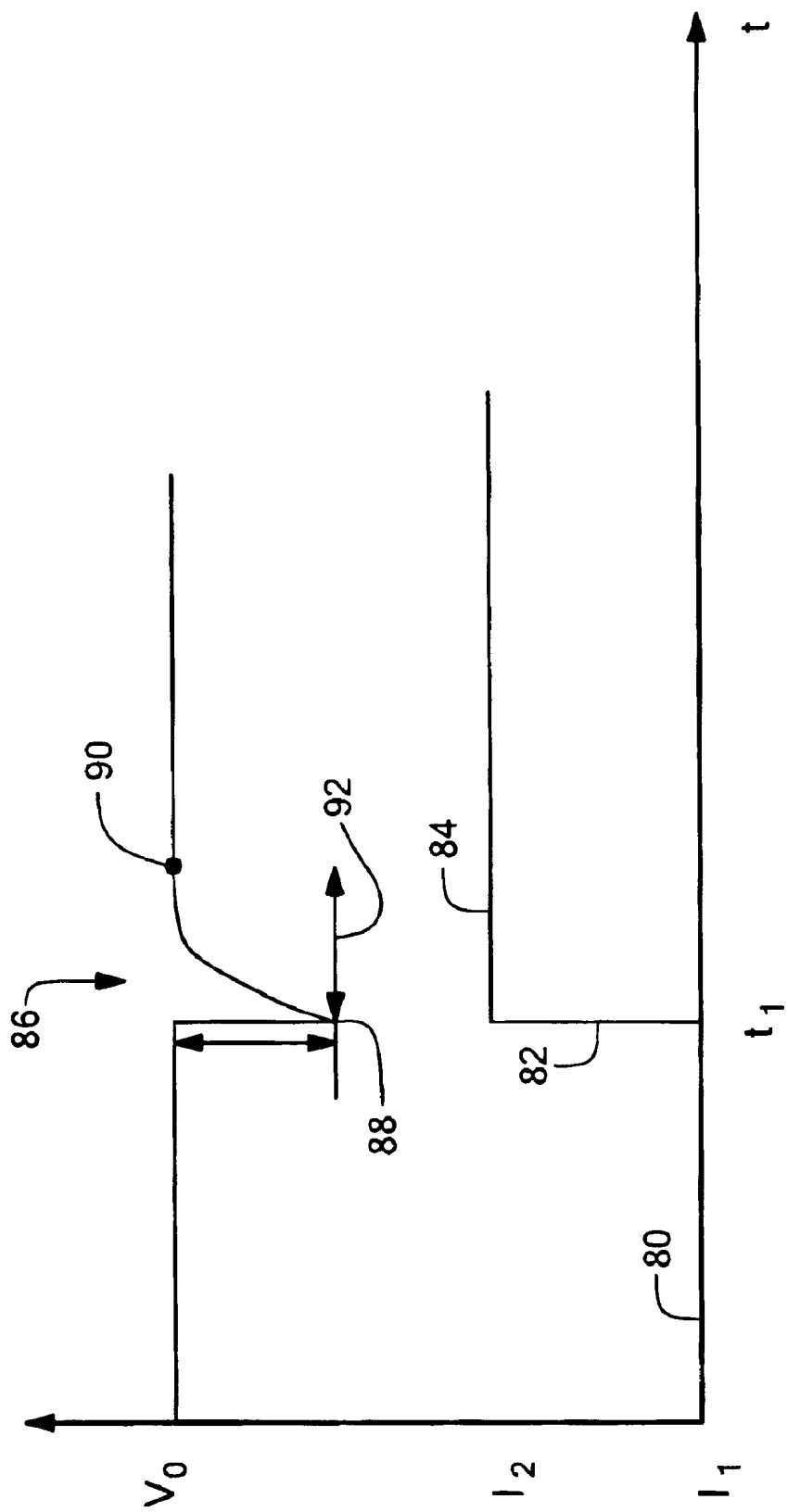
FIG. 2 shows voltage and current waveforms illustrating a decrease in load voltage which accompanies a sudden increase in load current demand in prior art devices.

In a typical operation cycle, FIG. 2 the current may be at an initial level $I_1$ 80. Upon a demand from the load at time $t_1$ there is a step change, 82 to a higher current, $I_2$ at 84. This simultaneously produced a glitch or change 86 in the output voltage. The recovery time is measured from the start of the glitch 88 at time $t_1$, until the time it reassumes its initial level 90. The recovery time is indicated by double-headed arrow 92.

Figure 3:
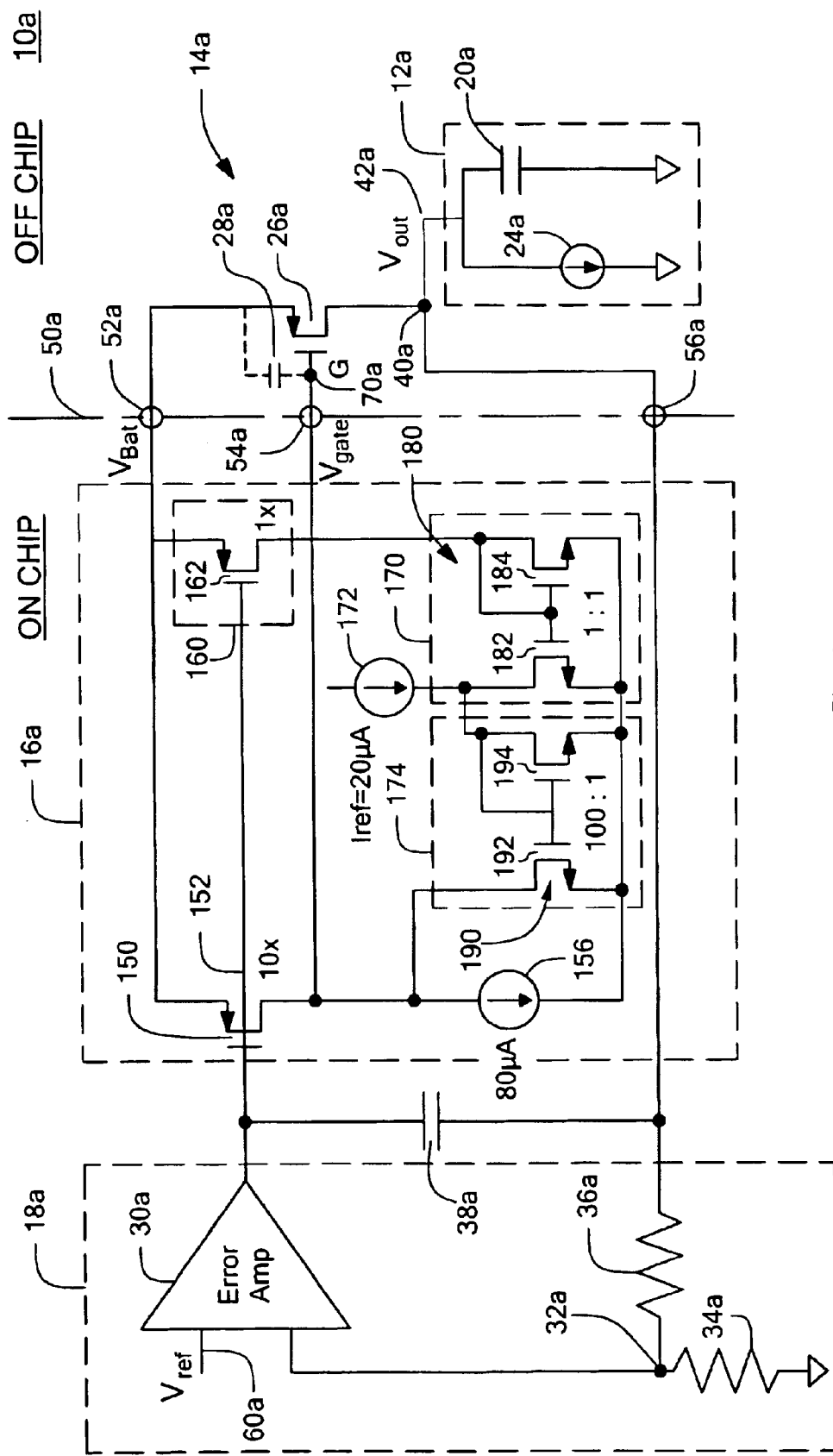
FIG. 3 is a schematic diagram of a voltage regulator with dynamically boosted bias current according to this invention.

In accordance with this invention, driver circuit 16a, FIG. 3, includes amplifier 150, such as transistor 152, which senses the error signal from error amplifier 30a when load 12a demands increased current. Without the dynamic current boost circuit, 160, 170, 172, 174, the error signal from error amplifier 30a will rise, turning off transistor 152 and causing the voltage at gate 70a of transistor 26a in pass device 14a to decrease as the gate to source capacitance $C_g$, 28a, is charged by the current source 156. Since transistor 26a is conducting more heavily the increased demand for current from load 12a will be met. However, the current available to charge 28a is limited, which results in a large output voltage transient at 42a. Conversely, when the demand for current from load 12a diminishes, the signal from error amplifier 30a will decrease causing transistor 152 to conduct more, causing the voltage at gate 70a of transistor 26a in pass device 14a to increase as the gate to source capacitance, $C_g$, 28a, is discharged through transistor 152.

In accordance with this invention a dynamic boost circuit, 160, 170, 172, 174 augments the current available to charge capacitance 28a which decreases the output voltage transient at 42a. Sensor circuit 160 including transistor 162 senses a portion of the error signal delivered from error amplifier 30a to transistor 152, typically in a ratio of ten to one. That is, the area of transistor 162 would be one tenth of the area of transistor 152 and so would pass one tenth or ten percent of the current attendant on the error signal. This portion of the error signal is delivered to a second error circuit 170, which compares that error signal with the current from reference current source 172. Any difference between the two currents causes a second error signal, which is delivered to boost circuit 174. Boost circuit 174 provides a substantial gain up to the error signal to boost the amount of current that can be serviced for transistor 26a. For example, if transistor 152 is shut off, transistor 162 is also shut off, so that the portion of the error signal sensing circuit 160 to second error circuit 170 is zero, the error signal thus produced between that signal and the reference current source 172 is the full value of the reference current source. Supposing then that reference current source 172 has a nominal current of twenty micro-amps and that while second error circuit 170 has unity gain, boost circuit 174 has a hundred to one gain. The capacity of the boost circuit would be two milli-amps added to the eighty micro-amps capacity of current source 156. Thus a substantial current sink can be provided in times of high load demand while the system requires only a low static bias current at other times. This is so because of the dynamic boost available through sensing circuit 160, second error circuit 170, and boost circuit 174. The decrease in gain from ten to one from transistor 152 to transistor 162, combined with the increase in gain from one to a hundred in boost circuit 174 results in an overall loop gain of ten. This in turn results in a overall impedance decrease by a factor of ten, which also substantially increases the bandwidth.

The values of 80 micro-amps and 20 micro-amps for the two current sources 156 and 172 respectively and the ratio of ten to one of transistors 152 and 162 as well as the unity gain in second error circuit 170 and hundred to one gain in boost circuit 174 are examples specific to this embodiment only, as these values would vary in dependence upon a particular application. The second error circuit 170 may be implemented with a mirror circuit 180 including two transistors 182 and 184. Boost circuit 174 may also be implemented using a mirror circuit 190 including two transistors 192 and 194 but other types of circuits may be used to produce the same function: that is, to compare a portion of the error signal and the referenced current source 172 to provide a second error signal. The use of a boost circuit 174 to gain up that second error signal by a substantial factor can be implemented in a number of other ways besides the current mirrors shown.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A voltage regulator with dynamically boosted bias current comprising:
   a pass device for providing current to a load;
   an error circuit responsive to a difference between a predetermined reference voltage and a function of the voltage on the load, to produce an error signal; and
   a driver circuit, responsive to said error signal, for controlling said pass device to adjust the current to the load to reduce the error signal; said driver circuit including an amplifier responsive to said error signal for controlling said pass device; a bias current source for biasing said amplifier; a sensing circuit for sensing a portion of said error signal; a reference current source for providing a reference current; a second error circuit responsive to a difference between said portion of said error signal and said reference current to produce a second error signal; and a boost circuit responsive to said second error signal to increase the bias current provided to said amplifier when the load demands more current.

2. The voltage regulator with dynamically boosted bias current of claim 1 in which said pass device includes a transistor.

3. The voltage regulator with dynamically boosted bias current of claim 1 in which said error circuit includes an error amplifier and a voltage divider for providing a fraction of the sensed voltage on the load to said error amplifier.

4. The voltage regulator with dynamically boosted bias current of claim 1 in which said second error circuit includes a first current mirror responsive to said portion of said error signal and said reference current to produce said second error current.

5. The voltage regulator with dynamically boosted bias current of claim 1 in which said boost circuit includes a second mirror circuit for gaining up said second error signal to increase the bias current provided to said amplifier when the load demands more current.

6. The voltage regulator with dynamically boosted bias current of claim 1 in, which said portion of said error signal is approximately an order of magnitude less than said error signal.

7. The voltage regulator with dynamically boosted bias current of claim 1 in which said boost circuit has a gain of at least one order of magnitude.

8. The voltage regulator with dynamically boosted bias current of claim 1 in which said second error circuit has a gain of approximately unity.

9. The voltage regulator with dynamically boosted bias current of claim 1 in which said error circuit and driver circuit are on-chip and said pass device is off-chip.

* * * * *